United States Patent [19]
Kilgour

[11] Patent Number: 5,198,474
[45] Date of Patent: Mar. 30, 1993

[54] SILICONE SURFACTANTS HAVING T-BUTYL TERMINATED POLYETHER PENDANTS FOR USE IN HIGH RESILIENCE POLYURETHANE FOAM

[75] Inventor: John A. Kilgour, Putnam Valley, N.Y.

[73] Assignee: Union Carbide Chemicals & Plastics Technology Corporation, Danbury, Conn.

[21] Appl. No.: 906,505

[22] Filed: Jun. 30, 1992

[51] Int. Cl.$^5$ .............................................. C08G 18/00
[52] U.S. Cl. .................................... 521/112; 521/154; 521/174
[58] Field of Search ........................ 521/112, 154, 174

[56] References Cited

U.S. PATENT DOCUMENTS

| | | | |
|---|---|---|---|
| 2,901,445 | 8/1959 | Harris | 260/2.5 |
| 3,061,556 | 10/1962 | Gemeinhardt | 260/2.5 |
| 3,741,917 | 6/1973 | Morehouse | 260/2.5 |
| 3,839,384 | 10/1974 | Morehouse | 260/448.2 |
| 3,884,847 | 5/1975 | Pruvost et al. | 260/2.5 |
| 3,896,062 | 7/1975 | Morehouse | 260/2.5 |
| 3,905,924 | 9/1975 | Prokai | 260/448.2 |
| 3,931,066 | 1/1976 | Puig et al. | 260/2.5 |
| 3,935,133 | 1/1976 | van Leuwen et al. | 260/2.5 |
| 3,952,038 | 4/1976 | Prokai | 260/448.2 |
| 3,957,843 | 5/1976 | Bennett | 521/112 |
| 3,966,784 | 6/1976 | Prokai | 260/448.2 |
| 4,031,044 | 6/1977 | Joslyn | 260/2.5 |
| 4,039,490 | 8/1977 | Kanner | 260/2.5 |
| 4,042,540 | 8/1977 | Lammerting et al. | 260/2.5 |
| 4,067,828 | 1/1978 | Kanner et al. | 260/2.5 |
| 4,077,993 | 3/1978 | Knollmueller | 260/448.2 |
| 4,097,406 | 6/1978 | Scott et al. | 252/351 |
| 4,110,272 | 8/1978 | Kanner et al. | 521/111 |
| 4,119,582 | 10/1978 | Matsubara et al. | 521/112 |
| 4,139,503 | 2/1979 | Kollmeier et al. | 521/112 |
| 4,160,776 | 7/1979 | Scardera et al. | 260/448.2 |
| 4,198,346 | 4/1980 | Knollmeuller | 556/463 |
| 4,206,289 | 6/1980 | Meiners et al. | 521/110 |
| 4,210,726 | 7/1980 | Hamamura et al. | 521/110 |
| 4,226,794 | 10/1980 | Scardera et al. | 556/443 |
| 4,304,875 | 12/1981 | Duvernay et al. | 521/112 |
| 4,306,035 | 12/1981 | Baskent et al. | 521/110 |
| 4,309,508 | 1/1982 | Baskent et al. | 521/112 |
| 4,477,601 | 10/1984 | Battice | 521/112 |
| 4,478,957 | 10/1984 | Klietsch et al. | 521/112 |
| 4,690,955 | 9/1987 | Kilgour et al. | 521/112 |
| 4,746,683 | 5/1988 | Kilgour | 521/112 |
| 4,769,174 | 9/1988 | Kilgour | 252/351 |
| 5,145,879 | 9/1992 | Budnik et al. | 54/112 |

FOREIGN PATENT DOCUMENTS 3215317 6/1983 Fed. Rep. of Germany .

Primary Examiner—Morton Foelak
Attorney, Agent, or Firm—W. F. Gray

[57] ABSTRACT

Siloxane-polyether copolymer surfactants for manufacture of high resiliency polyurethane foam which are capped with t-butyl groups on the ends of the polyether blocks, polyurethane foam compositions containing such surfactants, a method for making polyurethane foam using such surfactants, and polyurethane foam made the method are disclosed and claimed. The t-butyl-capped surfactants afford improved surfactant potencies and foam breathabilities relative to the commonly-employed methyl-capped surfactants.

4 Claims, No Drawings

SILICONE SURFACTANTS HAVING T-BUTYL TERMINATED POLYETHER PENDANTS FOR USE IN HIGH RESILIENCE POLYURETHANE FOAM

FIELD OF THE INVENTION

This application relates to polyurethane foam, and more particularly, to polysiloxane-polyoxyalkylene copolymer surfactants containing the t-butyl group in the terminal position of the polyoxyalkylene portion of the copolymers, for use in manufacturing high resilience polyurethane foams.

BACKGROUND OF THE INVENTION

High resiliency polyurethane foams are produced by the reaction of organic osocyanates, water, and high molecular weight polyols which have greater than 40% of primary hydroxyl capping. They are distinguishable, in part, from conventional hot cure polyurethane foams by the use of such a high percentage of primary hydroxyl groups, as well as by the fact that they require little or no oven curing. Thus they are often referred to as cold cure foams. High resiliency polyurethane foams are extremely desirable for cushioning applications because of the excellent physical properties they offer such as high resiliency, open cell structure, low fatigue for long life, and high sag factors for good load bearing capabilities.

The ingredients for high resiliency polyurethane foam are highly reactive, and consequently, there is a rapid buildup of gel strength in the foaming reaction, which sometimes permits the foam to be obtained without use of a cell stabilizer. However, such unstabilized foams typically have very irregular and coarse cell structures, evidenced by surface voids. This problem has generally been addressed by using substituted certain polydimethylsiloxane-polyoxyalkylene or polyphenylmethylsiloxane-polyoxyalkylene copolymers as foam stabilizers.

Polysiloxane-polyoxyalkylene copolymer surfactants for use as stabilizers for high resilience polyurethane foam are disclosed, for example, in the following U.S. Pat. No. 3,741,917 of Morehouse; U.S. Pat. No. 4,478,957 of Klietsch et al.; U.S. Pat. No. 4,031,044 of Joslyn; U.S. Pat. No. 4,477,601 of Battice; U.S. Pat. No. 4,119,582 of Matsubara et al.; U.S. Pat. No. 4,139,503 of Kollmeier et al.; and several patents of Kilgour, U.S. Pat. Nos. 4,690,955; 4,746,683; and 4,769,174. These references variously disclose that the terminal oxygen atom of the polyoxyalkylene portion of the surfactant molecules may bear a hydrogen atom (Morehouse '917, Klietsch '957, Kollmeier '503), an alkyl group of 1-4 carbon atoms (Morehouse '917, Klietsch '957, Kilgour '955, '683, and '174), an alkyl group containing fewer than 10 atoms in total (Joslyn '044), an alkyl group containing a total of less than 11 carbon atoms (Battice '601), or a monovalent hydrocarbon group (Matsubara '582). Methyl capping is commonly used. In addition, several other capping groups are disclosed. Those skilled in the art apparently have not believed that there are any advantages to be gained by use of any particular alkyl capping groups.

Surfactants for stabilization of polyurethane foam are evaluated on the basis of several different performance characteristics. Primary among these is the potency or efficiency of the surfactant. The minimal amount of surfactant needed to provide good cell structure in the resulting foam is a relative measure of the potency. Polyurethane foam having good cell structure can be produced using less of a superior surfactant than would be required using a less potent surfactant. The ability to use less material is desirable in the foaming industry to lower the cost of foaming operations.

Of further concern in selecting a surfactant for polyurethane foam stabilization is the breathability or open-celled character of foam. High breathability (more open-celled character) of the foam is desirable, as it provides a greater processing latitude. A narrow processing latitude forces the foam manufacturer to adhere to very close tolerances in metering out the foaming ingredients, which cannot always be accomplished. Further, greater breathability provides foam that is considerably easier to crush, thus avoiding splits that might occur during crushing. This characteristic is particularly desirable in foamed parts that incorporate wire inserts, which are difficult to crush.

In the design and development of surfactants for use as stabilizers for high resilience polyurethane foam, there has traditionally been a trade-off between increasing the potency (efficiency) of the surfactant and lowering the breathability of the foam produced using it. It has generally been found that the more potent the surfactant, the lower the breathability of the foam made using it. In other words, the more potent surfactants generally afford poorer processing latitudes.

It would be very desirable to have silicone surfactants for stabilization of high resilience polyurethane foam, which afford both good potency and good breathability, thus providing foam manufacturers with relatively low surfactant costs as well as good processing latitude. Such surfactants are the subject of this application.

SUMMARY

The present invention provides t-butyl capped siloxane-polyoxyalkylene surfactants for manufacture of high resilience polyurethane foam. These surfactants afford higher potency in manufacture of high resiliency polyurethane foam and also produce more open or breathable foam than would be predicted, relative to otherwise similar surfactants of the prior art in which the polyether portion of the molecule is terminated with a low molecular weight alkyl group.

The surfactants of this invention are compositions of matter having the generalized average formula $$M^*D_xD^*_yM^*$$

wherein
 $M^*$ represents $R_n(CH_3)_{3-n}SiO_{\frac{1}{2}}$; 
 D represents $(CH_3)_2SiO_{2/2}$;
 $D^*$ represents $(CH_3)(R)SiO_{2/2}$;
 n is 0 to 1;
 x is 0 to 8;
 y is 0 to 8; and
 the sum of n and y is 0.5 to 8.

In the above formulae for $M^*$ and $D^*$, R is at least one polyether-containing substituent having the generalized average formula $$-C_{n'}H_{2n'}O(C_2H_4O)_b(C_3H_6O)_cC(CH_3)_3$$ 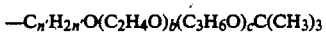

wherein
 n' is an integer from 2 to 4;
 b is a number from 0 to 10;

c is a number from 0 to 10; and the sum of b plus c is a number from 1 to 10.

The invention also relates to polyurethane foam compositions comprising:

(a) a polyether polyol containing at least an average of 2.4 hydroxyl groups per molecule;

(b) an organic polyisocyanate;

(c) at least one catalyst for production of polyurethane foam;

(d) a blowing agent; and (e) a siloxane-polyoxyalkylene copolymer as defined above.

The invention further relates to a method of preparing a polyurethane foam by the steps of 1) preparing a mixture comprising:

(a) a polyether polyol containing at least an average of 2.4 hydroxyl groups per molecule;

(b) an organic polyisocyanate;

(c) at least one catalyst for production of polyurethane foam;

(d) a blowing agent; and (e) a siloxane-polyoxyalkylene copolymer as defined above;

2) allowing the mixture to foam; and 3) curing the foamed composition.

The invention further relates to polyurethane foam produced using the above-described method.

DETAILED DESCRIPTION OF THE INVENTION

The t-butyl terminated silicone surfactants of the invention are polydialkylsiloxane-polyoxyalkylene block copolymers containing polydialkylsiloxane backbones and t-butyl terminated polyoxyalkylene pendant groups. They have the generalized average formula $$M^*D_xD^*_yM^*$$

wherein $M^*$ represents $R_n(CH_3)_{3-n}SiO_{\frac{1}{2}}$; D represents $(CH_3)_2SiO_{2/2}$; $D^*$ represents $(CH_3)(R)SiO_{2/2}$; n is 0 to 1, preferably 0; x is 0 to 8, preferably 1 to 5, and most preferably 1 to 3; y is 0 to 8, preferably 0.5 to 4, and most preferably 0.5 to 2; and the sum of n and y is 0.5 to 8, preferably 0.5 to 4, and most preferably 0.5 to 2.

In the above formulae for $M^*$ and $D^*$, R is at least one polyether-containing substituent having the generalized average formula

$$-C_{n'}H_{2n'}O(C_2H_4O)_b(C_3H_6O)_cC(CH_3)_3$$

wherein n' is an integer from 2 to 4, preferably 3; b is a number from 0 to 10; c is a number from 0 to 10; and the sum of b plus c is a number from 1 to 10. The numbers of polyoxyalkylene units, represented by the subscripts b and c, are chosen such that the formula weights of the polyoxyalkylene chains are preferably in the range 50–750, most preferably 100–350.

Procedures for synthesizing nonhydrolyzable silicone surfactants having polyoxyalkylene pendant groups are well known. Representative disclosures are provided in U.S. Pat. Nos. 4,147,847; 4,855,379; and 4,031,044.

Typically, the surfactants of the invention are prepared by causing a polyhydridosiloxane of generalized average formula $M^{}D_xD'_yM^{}$ to react with a terminally unsaturated oxyalkylene polymer in the presence of a hydrosilylation catalyst such as chloroplatinic acid. In the formula for the polyhydridosiloxane, $M^{**}$ is $H_n(CH_3)_{3-n}SiO_{\frac{1}{2}}$, wherein n is 0 to 1, preferably 0; D is $(CH_3)_2SiO_{2/2}$ as defined above; and $D'$ represents $(CH_3)(H)SiO_{2/2}$. The subscript x is 0 to 8, preferably 1 to 5, and most preferably 1 to 3. The subscript y is 0 to 8, preferably 0.5 to 4, and most preferably 0.5 to 2. The sum of n and y is 0.5 to 8, preferably 0.5 to 4, and most preferably 0.5 to 2.

In carrying out the preparation of the desired surfactants, the polyhydridosiloxane starting material and about 5–10% of the required unsaturated oxyalkylene polymer are mixed, then the catalyst is added, the mixture is heated to about 65° C., a temperature rise of about 10°–15° C. is observed, and thereafter the remainder of the polyether is added at a rate to keep the temperature in the range 90°–95° C. The mixture is finally sampled and analyzed for SiH groups by adding an alcohol and base and measuring evolved hydrogen. The mixture is generally neutralized with a weak base such as $NaHCO_3$, then filtered.

The starting polyhydridosiloxanes of generalized average formula $M^{}D_xD'_yM^{}$ are prepared in the manner known to the art. An alkyldisiloxane such as hexamethyldisiloxane and/or a hydridoalkyldisiloxane such as dihydridotetramethyldisiloxane, a polyhydridomethylsiloxane polymer, and an alkyl cyclosiloxane such as octamethylcyclotetrasiloxane are reacted in the presence of a strong acid such as sulfuric acid as taught by U.S. Pat. No. 3,741,917. It is understood by the art that certain of these starting materials may contain small amounts of tertiary siloxy units $(alkyl)SiO_{3/2}$, thus resulting in the introduction of such units into the siloxane backbone of the final products formed. Such impurities are not shown in the general formulae herein.

The starting terminally unsaturated oxyalkylene polymers, also referred to as polyethers, are likewise prepared in the manner known to the art. An unsaturated alcohol of the desired structure, preferably allyl alcohol or methallyl alcohol, is combined with appropriate amounts of ethylene oxide and propylene oxide in the presence of an acid or a base to yield the desired polyether with a terminal hydroxyl group. This is then capped with a t-butyl group.

The process for capping of polyethers is well known to the art. Capping with t-butyl groups is disclosed in a number of patents and journal publications: for example, U.S. Pat. No. 4,182,913; Hydrocarbon Processing, 56, pages 98 and 185 (1977); Oil and Gas Journal, 77, page 7 (1979); and Tetrahedron Letters, 29, page 2951 (1988).

In the present invention, the unsaturated t-butyl-capped polyoxyalkylene starting materials are made by first preparing a desired olefinically unsaturated hydroxy-terminated polyoxyalkylene of the structure:

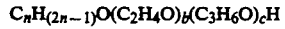
$$C_nH_{(2n-1)}O(C_2H_4O)_b(C_3H_6O)_cH$$

where n is an integer of 2 to 4, preferably 3; b has a value of 0 to 10; c has a value of 0 to 10; and b+c equals 1 to 10 to provide a molecular weight which is preferably 50–750, and most preferably 100–350. The t-butyl terminal capping group is then attached via an acid catalyzed condensation of isobutylene with the unsaturated polyoxyalkylene, to produce the desired olefinically unsaturated t-butyl-capped polyoxyalkylene of the structure:

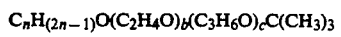
$$C_nH_{(2n-1)}O(C_2H_4O)_b(C_3H_6O)_cC(CH_3)_3$$

An alternative method of preparing the t-butyl-capped unsaturated polyoxyalkylene starting materials is to use t-butyl alcohol as a starting unit and react the appropriate epoxy monomers with this to achieve the desired polyoxyalkylene, which is then capped with an unsaturated alcohol as taught by U.S. Pat. Nos. 2,425,755; 2,448,664; and 3,057,923.

High resilience polyurethane foams are prepared by reacting an appropriate high molecular weight polyether polyol in which a high percentage of the hydroxyl groups are primary hydroxyls, an organic polyisocyanate, and a blowing agent, in the presence of a suitable catalyst and a suitable foam stabilizer. The stabilizer is generally a polysiloxane-polyoxyalkylene copolymer surfactant. They may optionally also contain reinforcing grafted copolymer polyols. This chemistry is well known to those skilled in the art.

The polyether polyol reactants employed as the starting materials to prepare the polyurethane foams are polyethers containing an average of at least 2.4 hydroxyl groups per molecule, up to a maximum of 3 hydroxyl groups per molecule, and containing at least 40 mole percent of primary hydroxyl groups. They have molecular weights from about 2,000 to about 8,000. Conversely, these polyethers can contain no more than 60 percent secondary hydroxyl groups. Preferably, they contain from 55 to 90 mole percent of primary hydroxyl groups and have a molecular weight from 4,000 to 7,000.

The preferred polyethers used are nominally polyalkylene-ether triols obtained by the chemical addition of alkylene oxides to organic triols such as glycerol; 1,2,6-hexanetriol; 1,1,1-trimethylolethane; and 1,1,1-trimethylolpropane, as well as mixtures thereof. The alkylene oxides employed in producing the preferred polyethers described above normally have from 2 to 4 carbon atoms, inclusive. Propylene oxide and mixtures of propylene oxide and ethylene oxide are especially preferred.

The organic polyol starting materials may be mixtures of the above-defined nominal polyether triols with other polyether polyols having an average of at least two hydroxyl groups, the nominal polyether triols amounting to at least 40, and preferably 50, weight percent of the total polyol content of the mixtures. Illustrative of such other polyethers are triols outside of the scope defined above, diols, tetrols, and polymer/polyols, as well as mixtures thereof.

Examples of polyether polyols that can be mixed with the above-defined polyether triols include adducts of alkylene oxides and such polyols as diethylene glycol; dipropylene glycol; pentaerythritol; sorbitol; sucrose; lactose; alphamethylglucoside; alpha-hydroxyalkylglucoside; novolac resin; ethylene glycol; propylene glycol; trimethylene glycol; 1,2-butylene glycol; 1,3-butanediol; 1,4-butanediol; 1,5-pentanediol; 1,2-hexanediol; 1,2-hexane glycol; 1,10-decanediol; 1,2-cyclohexanediol; 2-butene-1,4-diol; 3-cyclohexane-1,1-dimethanol; 4-methyl-3-cyclohexene-1,1-dimethanol; 3-methyl-1,5-pentanediol; and 4-(2-hydroxyethoxy)-1-butanol; as well as mixtures thereof.

A variety of organic isocyanates can be employed in the foam formulations of this invention for reaction with the organic polyol starting materials described above to provide polyurethane foams. Preferred isocyanates are polyisocyanates and polythiocyanates of the general formula Q(NCY)i wherein Y is O or S, i is an integer of two or more and Q is an organic radical having the valence of i. For example, Q can be a substituted or unsubstituted hydrocarbon radical such as alkylene or arylene, having one or more aryl-NCO bonds and/or one or more alkyl-NCO bonds. Examples of such compounds include hexamethylene diisocyanate, xylene diisocyanates, (OCNCH$_2$CH$_2$CH$_2$OCH$_2$)$_2$O, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethyl-4,4',4''-triisocyanate, and isopropylbenzenealpha-4-diisocyanate. Further included among the isocyanates useful in the formation of high resiliency polyurethane foams are dimers and trimers of isocyanates such as those having the general formulae Q(NCO)$_i$ and (Q(NCO)$_i$)$_j$ in which i and j are integers of two or more, and/or (as additional components in the reaction mixtures) compounds of the general formula L(NCO)$_i$ in which i is one or more and L is a monofunctional or polyfunctional atom or radical different from Q.

More specifically, the polyisocyanate component employed in the polyurethane foams of this invention also include the following specific compounds as well as mixtures of two or more of them: 2,4-tolylene diisocyanate, crude tolylene diisocyanate, bis(4-isocyanatophenyl)methane, polymethane polyphenylisocyanates that are produced by phosgenation of aniline-formaldehyde condensation products, 2,4,6-toluenetriisocyanate, and many other organic polyisocyanates that are known in the art such as those disclosed in an article by Siefken, Ann., 565, 75 (1949). In general, the aromatic polyisocyanates are preferred.

Particularly useful isocyanate components of high resiliency formulations within the scope of this invention are combinations of isomeric tolylene diisocyanates and polymeric isocyanates having units of the formula

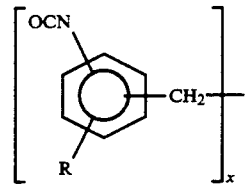

wherein each R is hydrogen or lower alkyl and x has a value of at least 2.1. Preferably R is a methyl radical and x has a value of from 2.1 to about 3.0.

The amount of polyisocyanate employed will vary slightly depending on the nature of the polyurethane being prepared. In general the polyisocyanates are employed in the foam formulations in amounts ranging from 80 to 150 percent, preferably from 90 to 120 percent, of the stoichiometric amount of the isocyanato groups required to react with all of the hydroxyl groups of the organic polyol starting materials and with any water present as a blowing agent. Most preferably, a slight excess of isocyanato groups beyond the stoichiometric amount is employed.

The blowing agents which can be employed in the process of this invention include water, liquified gases which have boiling points below 20° C. and above −50° C., or other inert gases such as nitrogen, carbon dioxide, helium and argon. Suitable liquified gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichlorofluoromethane, dichlorodifluoromethane, dichlorofluoromethane, 1,1-dichloro-1-fluoroethane, 1,1-difluoro-1,2,2-trichloroethane, and 1,1,1,2,3,3,4,4,4-nonafluoro-2-chlorobutane. The preferred blowing agent is trichlorofluoromethane. The amount of blowing agent used will vary the density in the foamed product. Usually from 2 to 20 parts by weight of the blowing agent per 100 parts by weight of the organic polyol starting materials are preferred.

The catalysts employed in this invention to produce polyurethanes include any of the amines or metal catalysts used in producing conventional flexible and high resiliency polyurethane foam. Illustrative of such conventional amine catalysts are N-methyl morpholine, N-ethyl morpholine, hexadecyl dimethylamine, triethylamine, N,N,N',N'-tetramethyl-1,3-butanediamine, N,N-dimethylethanolamine, dimethyl benzylamine, 3-dimethylamino-N,N-dimethylpropionamide, bis(2-dimethylaminoethyl)ether, N,N,N',N'-tetramethyl ethylenediamine, 4,4-methylene bis-(2-chloroaniline), N-coco-morpholine, triethylene diamine, the formate salts of triethylene diamine, other salts of triethylene diamine, and oxyalkylene adducts of primary and secondary amino groups. Illustrative of conventional metal catalysts are the tin salts of various carboxylic acids and nickel acetylacetonates. The preferred metal catalyst for the process of this invention is dibutyl tin dilaurate. Such amine and metal catalysts are preferably employed in the mixtures in an amount from 0.1 to 2 weight percent based on the total weight of the organic polyol starting material.

The amount of t-butyl terminated polysiloxane-polyoxyalkylene copolymer stabilizer used to make the polyurethane foam can vary over a wide range. It is generally employed in amounts ranging from about 0.01 to 5 parts by weight or greater per hundred parts of the organic polyol starting material. Generally there is no advantage to using the stabilizer in excess of five parts per hundred parts of polyol by weight, while the use of amounts below 0.01 parts by weight can result in foam instability. Preferably, the polysiloxane-polyoxyalkylene copolymer stabilizer is employed in amounts ranging from 0.01 to 2.0 parts by weight per hundred parts by weight of the organic polyol starting material.

Reinforcing grafted copolymer polyols may also be used in high resiliency foams. These are obtained by polymerizing ethylenically unsaturated monomers in a polyether as described in British Patent No. 1,063,222 and in U.S. Pat. No. 3,383,351. Suitable monomers for producing such compositions include, for example, acrylonitrile, vinyl chloride, styrene, butadiene, and vinylidene chloride. Suitable polymers for producing such compositions include, for example, those polyethers described above. These graft copolymer/polyether compositions can contain from about 1 to 70 weight percent, preferably 5 to 50 weight percent, and most preferably 10 to 45 weight percent of the unsaturated monomer polymerized in the polyether. Such compositions are conveniently prepared by polymerizing the monomer in the selected polyether at a temperature of 40° C. to 150° C. in the presence of a free radical polymerization catalyst, such as peroxides, persulfates, percarbonates, perborate and azo compounds as more fully described by the above patent references.

Suitable reinforcing graft copolymer polyols employed in this patent may also be obtained from reacting diisocyanates with polyamines or hydrazines in polyether polyol solutions as described in U.S. Pat. No. 4,042,537. Reactants for producing these grafted copolymer polyols include the polyisocyanates such as 2,4- and 2,6-toluene diisocyanates and mixtures of these isomers, polyphenyl-polymethylene polyisocyanates, and hexamethylene diisocyanate. The isocyantes are reacted with either polyamines or hydrazines to form the polymer dispersed within and grafted to the polyol solvent for the reaction. Suitable polyamines include divalent and higher polyvalent primary or secondary aliphatic, araliphatic, cycloaliphatic or aromatic amines. Specific examples include ethylene diamine, hexamethylene diamine, 4-aminobenzylamines, 4,4'-diaminodicyclohexylmethane, phenylene diamines, and toluene diamines. Suitable hydrazines include hydrazine, methyl hydrazine, hydrazine hydrate, phenyl hydrazine, benzyl hydrazine, and cyclohexyl hydrazine. The level of polyureas of polyhydrazodicarbonamides dispersed in the polyether polyol may vary within wide limits, although it is generally from 1 to 40 percent by weight based on 100 parts by weight of polyether polyol.

Other additional ingredients can be employed in minor amounts in producing the high resiliency polyurethane foams in accordance with the process of this invention, if desired, for specific purposes. Thus flame retardants (e.g. trichloroethylphosphine) can be used to reduce foam flammability. Of course, any suitable organic solvent for the catalysts can be used which does not substantially adversely affect the operation of the process or reactants. Examples of such solvents for the catalysts include polyols such as 2-methyl-2,4-pentanediol and dipropylene glycol.

The high resilience polyurethane foams can be produced by any suitable technique. The preferred process is a one-step or one shot technique wherein all of the reactants are reacted simultaneously in the foaming operation. A second general process is called the prepolymer process, in which a prepolymer is formed by reacting the polyether starting material with a small excess of the isocyanate, and the prepolymer is later foamed by reaction with water or by use of an inert blowing agent. Another method which can be used is the quasi-prepolymer technique, which involves initially reacting a large excess of the isocyanate with a portion of the polyether polyol, and later reacting this product with additional polyether in the presence of a blowing agent. Sometimes it is preferred to premix the polyether starting material and siloxane-polyoxyalkylene copolymer, although any suitable premixture of the various ingredients can be used. Because of the highly exothermic nature of the reaction, high resiliency polyurethane foams are rapidly produced without the need of any external heat by mixing the reactants at ambient temperature and pouring the foaming reaction into a suitable mold and allowing the foam to cure itself. If desired, the overall reaction can be acelerated further by preheating the mold and/or employing conventional high temperature post cure procedures. It is to be understood that the cold cure polyurethane foams of this invention can also be prepared in slabstock form if desired.

Experimental Section

The following examples and procedures are presented to illustrate the invention, but are not to be construed as limiting thereon.

Glossary

Various reagents and terms used in this work are identified below, in alphabetical order.

Amine Catalyst A is an amine catalyst made from bis(2-dimethylaminoethyl)ether and dipropylene glycol.

Amine Catalyst B is an amine catalyst made from triethylenediamine and dipropylene glycol.

Amberlyst H-15 catalyst is a supported acid catalyst available from Rohm and Haas.

AMTG is allylmethoxytriglycol, which is similar to APEG-200-t-butyl, but differs in being methyl capped.

APEG-200-t-butyl is allyl-started polyethylene glycol having a molecular weight of approximately 200, which is t-butyl capped.

APPG-200 is an allyl-started polypropylene glycol having a molecular weight of approximately 200.

L-31 is a polyhydridosiloxane polymer having the general formula $MD'_{45-60}M$.

Latitude refers to processing latitude, defined as the ratio of the breathability of the foam to the potency of the surfactant.

Polyol A is a polymer polyol containing about 40% by weight of acrylonitrile/styrene polymer in a polyol based on ethylene and propylene oxides which has a hydroxyl number of 31.

Polyol B is a polymer polyol based on ethylene and propylene oxides which has a hydroxyl number of 35.

TDI is toluene diisocyanate.

Synthesis of Siloxane-polyoxyalkylene Copolymer Surfactants

The siloxane-polyoxyalkylene copolymer surfactants to be tested were prepared by first equilibrating suitable amounts of precursors of $(CH_3)_3SiO_{\frac{1}{2}}(M)$, $(CH_3)_2SiO_{2/2}$ (D), and $CH_3(H)SiO_{2/2}$ (D') to make a distribution of SiH-containing oligomers with a nominal general average formula of $MD_xD'_yM$ in which x and y are dependent on the initial amounts of M, D and D' used. An allyl-started t-butyl-terminated polyoxyalkylene was then hydrosilylated onto the siloxane to form the copolymer, $MD_xD^*_yM$, where M, D, x and y are defined as above, and D* is the monomer unit bearing the pendant t-butyl-terminated polyoxyalkylene group. Although this method was used for the examples illustrated in this work, it is not the only procedure for preparing these structures.

Preparation of $MD_xD'_yM$ Fluids

A flask, fitted with a magnetic stirring bar and a reflux condenser under a positive pressure of argon, was charged with the desired amounts of hexamethyldisiloxane (MM), octamethylcyclotetrasiloxane (cyclic D4), L-31, and sulfuric acid. The mixture was stirred overnight at ambient temperature, then the sulfuric acid puddle was removed and an excess of sodium bicarbonate was added cautiously to neutralize residual acid. The mixture was treated with decolorizing carbon and then pressure filtered to give the product as a colorless liquid. The amounts of reagents employed in the preparation of the several starting materials are shown in Table A below.

TABLE A

Reagents Used for Preparation of $MD_xD'_yM$ Fluids

| Product | MM(g) | cyclic D4(g) | L-31(g) | wt % $H_2SO_4$ |
| --- | --- | --- | --- | --- |
| $MD_{1.85}D'_{1.2}M$ | 213.5 | 184.6 | 101.9 | 2 |
| $MD_{1.7}D'_{1.0}M$ | 229.1 | 181.3 | 90.8 | 2 |

TABLE A-continued

Reagents Used for Preparation of $MD_xD'_yM$ Fluids

| Product | MM(g) | cyclic D4(g) | L-31(g) | wt % $H_2SO_4$ |
| --- | --- | --- | --- | --- |
| $MD_{2.0}D'_{0.88}M$ | 219.7 | 204.0 | 76.4 | 2 |
| $MD_{2.0}D'_{1.0}M$ | 214.9 | 200.0 | 85.1 | 2 |
| $MD_{1.2}D'_{0.8}M$ | 267.1 | 148.6 | 84.3 | 2 |
| $MD_{1.5}D'_{1.5}M$ | 216.9 | 152.9 | 130.2 | 2 |
| $MD_{2.7}D'_{2.0}M$ | 161.9 | 207.3 | 130.8 | 2 |

Preparation of t-Butyl Capped Polyethers 305.85 grams (1.53 moles) of APEG-200 and 15.41 grams of Amberlyst H-15 catalyst were placed in a pressure reactor. The reactor was cooled to $-78°$ C., filled with 171.4 grams (3.06 moles) of isobutylene, sealed, warmed to 45° C., and stirred for 20 hours. The reactor was opened and the solution was filtered to remove the catalyst. The product was then neutralized with $NaHCO_3$. Analysis of the product indicated a 98.9% yield of t-butyl capped APEG-200.

The APPG-200 was similarly capped, using appropriate amounts of the reagents.

Preparation of the several siloxane-polyoxyalkylene copolymer surfactants.

150 g of $Me_3SiO(Me_2SiO)_{1.85}(MeHSiO)_{1.2}SiMe_3$ and 15.3 g of APEG-200-t-butyl were mixed in a 500 ml flask. 1.68 ml of a chloroplatinic acid solution (54 ppm Pt) was added and the resulting solution was heated to 65° C. As the reaction initiated, the temperature increased rapidly. When the temperature reached 90° C., an additional 160 g of APEG-200-t-butyl was added slowly to maintain the solution temperature at 90° C. to 95° C. Aliquots were taken periodically and tested for SiH. When no residual SiH was detected, the flask was cooled to room temperature and the solution was neutralized with $NaHCO_3$. The solution was filtered to give the copolymer. The same procedure was used to prepare the other copolymers, which are listed in Table B along with the amounts of reagents used in their preparation.

TABLE B

Reagents used in Hydrosilylation Reaction

| Product | SiH Fluid(g) | t-Butyl-APEG(g) | AMTG(g) | t-Butyl-APPG(g) |
| --- | --- | --- | --- | --- |
| $MD_{1.85}D^*_{1.2}M$ | 150 | 175.3 | | |
| $MD_{1.85}D^*_{1.2}M$ | 150 | | 138.6 | |
| $MD_{1.7}D^*_{1.0}M$ | 150 | 156.1 | | |
| $MD_{1.7}D^*_{1.0}M$ | 150 | | 123.5 | |
| $MD_{2.0}D^*_{0.88}M$ | 150 | 131.4 | | |
| $MD_{2.0}D^*_{0.88}M$ | 150 | | 103.9 | |
| $MD_{2.0}D^*_{1.0}M$ | 150 | 147.6 | | |
| $MD_{1.2}D^*_{0.8}M$ | 150 | 146.2 | | |
| $MD_{1.2}D^*_{0.8}M$ | 150 | | | 146.2 |
| $MD_{1.5}D^*_{1.5}M$ | 150 | 225.6 | | |
| $MD_{2.7}D^*_{2.0}M$ | 150 | 226.7 | | |

Foaming Formulation

Tests on the surfactants were based on the following foam formulation:

| Formulation 1 | |
| --- | --- |
| Component | Concentration* |
| Polyol A | 50 pphp |
| Polyol B | 50 |
| Amine Catalyst A | 0.1 |
| Amine Catalyst B | 0.5 |

-continued

Formulation 1

| Component | Concentration* |
|---|---|
| Diethanolamine | 0.9 |
| Water | 3.0 |
| TDI (103 index) | 36.8 |
| Surfactant | Varied |

*Concentration is expressed in parts per hundred parts of polyol (pphp).

Foaming Experiments

A general foaming procedure was adopted for all of the foaming tests. All the ingredients listed for each particular foam formulation were weighed into a cup, except for the isocyanate. This mixture was then stirred for 75 seconds, and allowed to degas for 15 seconds. The isocyanate was then added, the solution was stirred for a further 5 seconds, and the resultant polyurethane foam-forming composition was poured into the appropriate preheated mold, which was then sealed during the foaming reaction. After a five to ten minute cure, the mold was opened and the foam was evaluated.

Foam Breathability Test

Foam breathability refers to the openness of the cell structure of the polyurethane foam. It can be measured quantitatively by determining the air flow through a defined area and thickness of foam under standard conditions, but it may be gauged qualitatively by determining the surfactant level at which foam shrinkage begins to occur, as discussed below. Foam breathability in this work was measured using Formulation 1 shown below to make foams in a 15"×15"×4" box mold. The foaming solution, including a selected concentration of surfactant, was prepared as described above and poured into the mold, which was sealed while the foam cured. Upon removal, the foam was allowed to stand for 15 minutes. At this time the foam was observed for shrinkage. If no shrinkage had occurred, then a second foam was prepared using a higher concentration of surfactant. This process was repeated until a break point was determined such that the onset of shrinkage coincided with the increased surfactant concentration. Since shrinkage is related to the number of open cells in the foam, the breathability can be defined by the amount of surfactant required to cause foam shrinkage. Thus, the higher the surfactant concentration required for shrinkage to occur, the better the surfactant. The concentration of the surfactant required to cause shrinkage is referred to as the top end, a higher top end being better. Test results are given in Table 1 below.

Surfactant Potency (Efficiency) Test

Surfactant potency is defined as the minimum amount of material required to maintain foam cell size and cell distribution control. This is most easily observed by evaluating the basal cells in the foam. The minimal concentration for a given surfactant is reached when the basal structure is no longer fine celled. The more potent and thus preferred surfactants maintain a fine celled basal structure at lower concentrations than less potent surfactants. Surfactant potency (efficiency) was measured using the desired polysiloxane-polyoxyalkylene copolymers in Formulation 1 shown below to make foams in a 15"×15"×4" box mold as described above. To facilitate accurate introduction of surfactant, the copolymers were diluted to 20% by weight in the surfactant. For each surfactant tested, the minimum amount of surfactant needed for maintenance of a fine cell basal structure was determined. Results are recorded in Table 1 below.

Comparative Tests

Three pairs of copolymers were prepared for comparative testing. Three different polydimethylsiloxane structures were separately reacted with APEG-200-t-butyl to yield the surfactant copolymers. Comparative copolymers were prepared by reacting the same polydimetylsiloxane structures with allylmethoxytriglycol (AMTG), which is the same molecular weight allyl started polyether as APEG-200 but is terminated with a methyl group. The potencies, breathabilities, and processing latitude for each of these surfactants were determined as set forth above, and the results are shown in Table 1 below.

TABLE 1

Comparative foam performance test results for t-butyl terminated versus methyl terminated polyether pendant siloxane copolymers

| Silicone Copolymer | Pendant Structure | Potency[a] (Low End) pphp | Breath.[b] (Top End) pphp | Latitude (TE/LE)[c] |
|---|---|---|---|---|
| MD'$_{1.85}$D*$_{1.20}$M | APEG-200-t-butyl | 0.25 | 5.00 | 20.0 |
| | AMTG | 0.50 | 3.75 | 7.5 |
| MD$_{1.7}$D*$_{1.0}$M | APEG-200-t-butyl | 0.20 | 4.25 | 21.3 |
| | AMTG | 0.25 | 2.75 | 11.0 |
| MD$_{2.0}$D*$_{0.88}$M | APEG-200-t-butyl | 0.225 | 3.25 | 14.4 |
| | AMTG | 0.325 | 3.00 | 9.2 |

Footnotes for Table 1:
[a]Minimum amount of surfactant needed to produce good foam. Lower numbers indicate more potent surfactants.
[b]Breathability. The amount of surfactant required before shrinkage of the foam began to occur. Higher numbers are better.
[c]Processing latitude. Higher numbers are better.

A comparison of potency (efficiency) for each pair of copolymers shown in Table 1 reveals that in each case the t-butyl-terminated copolymer is significantly more potent than the methyl-terminated material. The foam breathability is also higher for the t-butyl-terminated copolymers. More importantly, the processing latitude is greater for the t-butyl-terminated copolymers. This is important, as the latitude reflects the range over which a foam manufacturer can use the surfactant to provide the desired cell control.

ADDITIONAL EXAMPLES

A number of additional siloxane-polyoxyalkylene copolymers made from t-butyl terminated APEG-200, and one example of a similar surfactant made from APPG-200, an allylpolyoxypropylene, were made in the same manner as the comparative examples above. Potency and breathability were again determined, and the results are shown in Table 2 below.

The materials presented in Table 2 illustrate additional compounds which are within the scope of the invention. The data presented for these additional materials are not comparable with the data shown in Table 1, since the siloxane backbones of the copolymers are different. It is believed, however, that the t-butyl-capped surfactants illustrated in Table 2 would be superior to the corresponding methyl-capped surfactants.

TABLE 2

| Silicone Copolymer | Pendant Structure | Potency[a] (Low End) pphp | Breath.[b] (Top End) pphp | Latitude (TE/LE)[c] |
|---|---|---|---|---|
| $MD^*_{2.0}D^*_{1.0}M$[d] | APEG-200-t-butyl | 0.175 | 1.50 | 8.6 |
| $MD_{1.2}D^*_{0.8}M$ | APEG-200-t-butyl | 0.50 | 5.00 | 10.0 |
| $MD_{1.5}D^*_{1.5}M$ | APEG-200-t-butyl | 0.425 | 2.75 | 6.5 |
| $MD_{2.7}D^*_{2.0}M$ | APEG-200-t-butyl | 0.275 | 1.50 | 5.5 |
| $MD_{1.2}D^*_{0.8}M$ | APPG-200-t-butyl | 0.250 | 0.75 | 3.0 |

Footnotes for Table 2:
[a]Minimum amount of surfactant needed to produce good foam. Lower numbers indicate more potent surfactants.
[b]Breathability. The amount of surfactant required before shrinkage of the foam began to occur. Higher numbers are better.
[c]Processing latitude. Higher numbers are better.
[d]The t-butyl capping was only about 90%.

The results shown in Table 2 demonstrate that these surfactants function in polyurethane foam.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A polyurethane foamable composition comprising:
   (a) a polyether polyol containing at least an average of 2.4 hydroxyl groups per molecule;
   (b) an organic polyisocyanate;
   (c) at least one catalyst for production of polyurethane foam;
   (d) a blowing agent; and
   (e) a siloxane-polyoxyalkylene copolymer having the generalized average formula $$M^*D_xD^*_yM^*$$

wherein
   $M^*$ represents $R_n(CH_3)_{3-n}SiO_{\frac{1}{2}}$;
   $D$ represents $(CH_3)_2SiO_{2/2}$;
   $D^*$ represents $(CH_3)(R)SiO_{2/2}$;
   n is 0 to 1;
   x is 0 to 8;
   y is 0 to 8; and
   the sum of n and y is 0.5 to 8; and in the above formulae for $M^*$ and $D^*$,
   R is a polyether-containing substituent having the general formula $$-C_{n'}H_{2n'}O(C_2H_4O)_b(C_3H_6O)_cC(CH_3)_3$$

wherein
   n' is an integer from 2 to 4;
   b is a number from 0 to 10;
   c is a number from 0 to 10; and
   the sum of b plus c is a number from 1 to 10; or a mixture of such polyether-containing substituents.

2. The foamable composition of claim 1, further comprising
   f) a polymer polyol.

3. A method of preparing a polyurethane foam by the steps of
   1) preparing a mixture comprising:
      (a) a polyether polyol containing at least an average of 2.4 hydroxyl groups per molecule;
      (b) an organic polyisocyanate;
      (c) at least one catalyst for production of polyurethane foam;
      (d) a blowing agent; and
      (e) a siloxane-polyoxyalkylene copolymer having the generalized average formula $$M^*D_xD^*_yM^*$$

wherein
   $M^*$ represents $R_n(CH_3)_{3-n}SiO_{\frac{1}{2}}$;
   $D$ represents $(CH_3)_2SiO_{2/2}$;
   $D^*$ represents $(CH_3)(R)SiO_{2/2}$;
   n is 0 to 1;
   x is 0 to 8;
   y is 0 to 8; and the sum of n and y is 0.5 to 8; and in the above formulae for $M^*$ and $D^*$,
   R is a polyether-containing substituent having the general formula $$-C_{n'}H_{2n'}O(C_2H_4O)_b(C_3H_6O)_cC(CH_3)_3$$

wherein
   n' is an integer from 2 to 4;
   b is a number from 0 to 10;
   c is a number from 0 to 10; and the sum of b plus c is a number from 1 to 10, or a mixture of such polyether-containing substituents;
   2) allowing the mixture to foam; and
   3) curing the foamed composition.

4. The method of preparing polyurethane foam of claim 3, wherein said mixture further comprises
   f) a polymer polyol.

* * * * *